United States Patent [19]

Kean, Jr.

[11] 4,372,713
[45] Feb. 8, 1983

[54] BULK MATERIAL RECEIVER

[75] Inventor: James P. Kean, Jr., Maumee, Ohio

[73] Assignee: Process Control Corporation, Atlanta, Ga.

[21] Appl. No.: 193,741

[22] Filed: Oct. 3, 1980

[51] Int. Cl.$^3$ ............................................. B65G 53/28
[52] U.S. Cl. ................................................. 406/172
[58] Field of Search ................ 406/172, 109; 55/302, 55/303; 210/445

[56] References Cited

U.S. PATENT DOCUMENTS

| | | | |
|---|---|---|---|
| 2,276,805 | 3/1942 | Tolman | 406/172 |
| 3,521,430 | 7/1970 | Vanderlip et al. | 406/172 X |
| 4,127,307 | 11/1978 | Bilkvist | 406/109 |
| 4,214,882 | 7/1980 | Brenholt | 55/302 |
| 4,298,360 | 11/1981 | Poll | 55/302 X |

*Primary Examiner*—John J. Love
*Assistant Examiner*—Gene A. Church
*Attorney, Agent, or Firm*—Jones & Askew

[57] ABSTRACT

The bulk material receiver and dispenser includes a hopper with a lower material outlet opening and an upper material and air inlet opening. The upper portion or "bonnet" of the hopper includes a pair of air passageways with a filter in each passageway, and a vacuum pump and valve are connected to the air passageways. When placed in operation, the vacuum pump induces a flow of air inwardly through one air passageway and out of the other passageway to back wash one of the air filters, and after a short time lapse, air is drawn through both air passageways to induce a flow of bulk material and air into the hopper. When a desired amount of bulk material has accumulated in the hopper, the other air passageway and filter are opened to the atmosphere and a stream of air from the atmosphere back washes the other filter.

9 Claims, 8 Drawing Figures

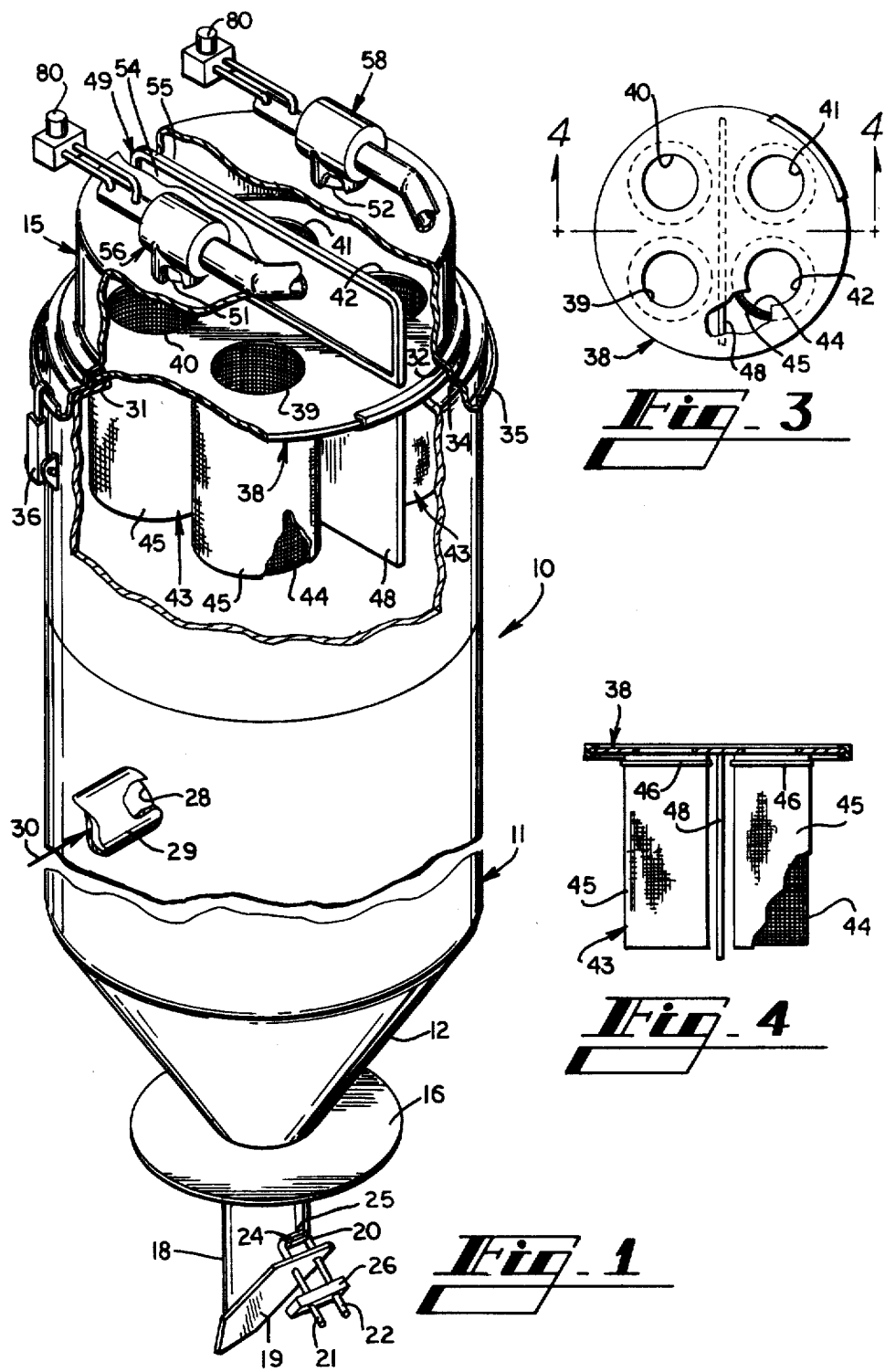

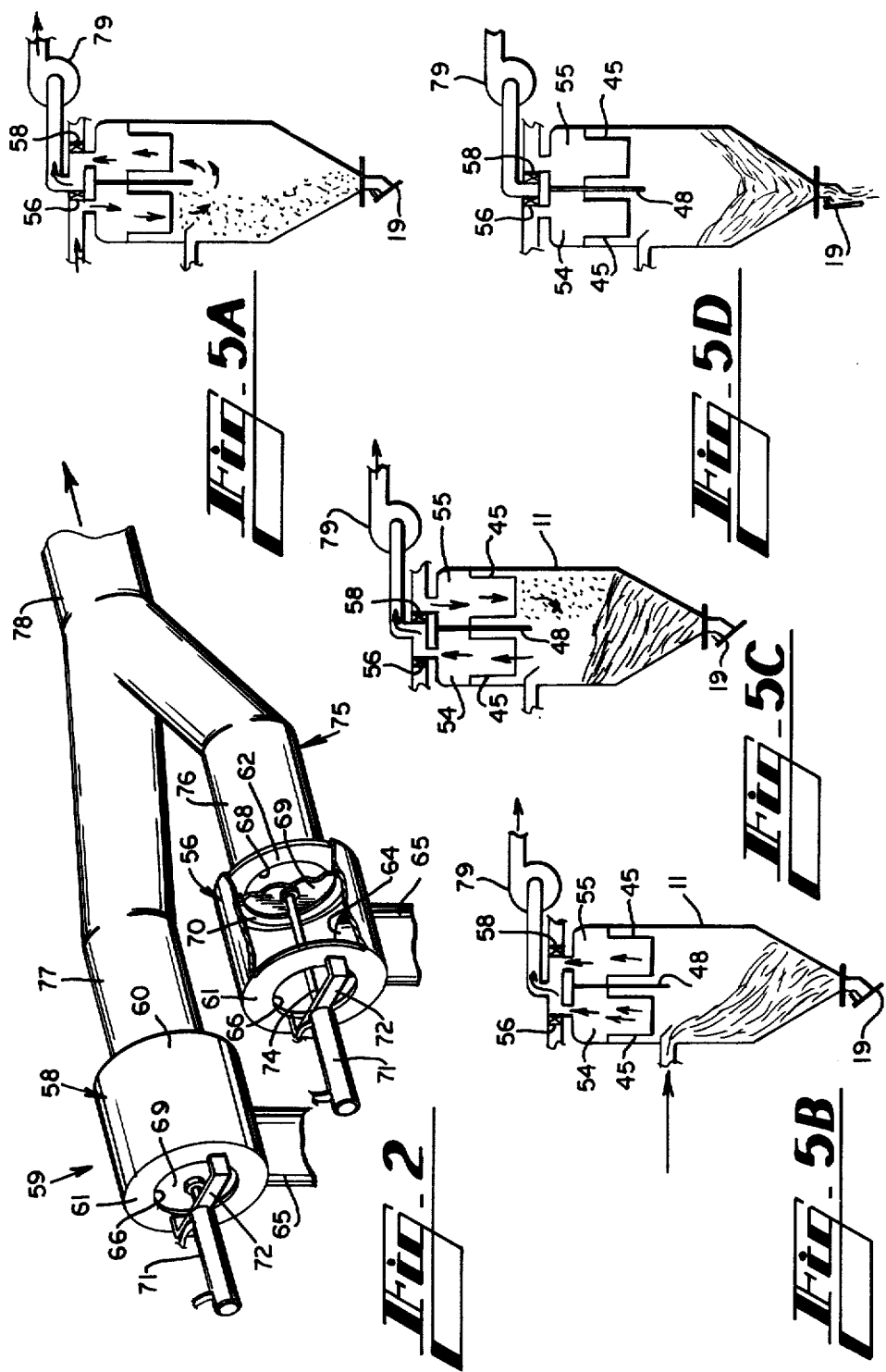

BULK MATERIAL RECEIVER

BACKGROUND OF THE INVENTION

This invention relates to a bulk material receiver and dispenser with filters wherein a vacuum is drawn in the receiver to induce a flow of bulk material to the receiver, and to a process for back washing the filters of the receiver.

Bulk materials frequently are transported from a source point to a hopper at the use point by means of a vacuum conveying system in which the bulk material is picked up in and moved through a conveying tube extending from the hopper by means of an air stream which is induced through the conveying tube by pulling a vacuum on the hopper. The hopper located at the use or delivery point usually is termed a vacuum receiver or a bulk material receiver. Air which is drawn through the conveying tube with the bulk material must be separated from the bulk material at the receiver so that relatively clean air can pass to the vacuum pump and substantially all of the material transported through the conveying tube drops into the bulk material receiver.

While separation of the material from the air stream presents no significant problems in the cases where the bulk material particles are of sufficient size to readily drop out of the air stream, bulk materials which have fine particles tend to carry over into the air stream exhausted from the receiver and into the vacuum pump, thus presenting a problem in that this amount of material would be wasted if passing through the vacuum pump and the material tends to damage the vacuum pump if not collected prior to passing through the vacuum pump. It is desirable to have a separation or filtration means for separating such fine material from the air stream, and it is further desirable that this filtration means be compact and situated in the bulk material receiver.

Such filtration devices for bulk material receivers have been designed and used in the past; however, with the prior art systems the system for cleaning the filter has presented several problems. One method for cleaning the filter of a bulk material receiver has been to simply allow air from the atmosphere to back flow through the filter when the vacuum pump is stopped at the end of fill cycle of the vacuum receiver. This proves ineffective because the quantity and velocity of air that passes through the filter is low. Another method of back flushing the filter has been the use of compressed air which flushes the filter when the vacuum pump is stopped at the end of the fill cycle. This method can effectively clean the filter; however, the method creates the problem of blowing fine particles out of the bottom of the vacuum receiver, thus creating a health hazard and a cleanliness problem. Similarly, another method used to back flush the filter media has been to reverse the vacuum pump at the end of the fill cycle, thus flushing the filter; however, this creates the same problem of blowing dusty material out the bottom of the vacuum receiver, thus creating a health hazard and a cleanliness problem.

A third method that has been used to back flush filters of a bulk material receiver has been to divert the exhaust of the vacuum pump and use this flow of air to back flush the filter. This method also creates a health and cleanliness problem due to dust flowing from the bottom of the vacuum receiver, and also creates the need for a rather large filter in front of the vacuum pump to handle the substantial carry over to the vacuum pump during the back flushing of the filter.

Another method now in use involves sequentially pulsing compressed air through one of several filter bags contained in the filtration system, thus cleaning one bag while drawing the additional flow generated by the compressed air through the other bags and, hence, to the vacuum pump. This involves expensive compressed air and an expensive sequencing system.

SUMMARY OF THE INVENTION

Briefly described, the present invention comprises a system for transporting bulk materials which utilizes an air stream under negative pressure, and to which material to be transported is introduced at the source point and delivered by the air stream to and dropped out into a vacuum receiver. The flow of air to the receiver is periodically interrupted, as when the receiver is full of bulk material, at which time the material is dispensed from the vacuum receiver.

This invention comprises a unique system for transporting materials with fine particles which are difficult to separate from the air stream in the vacuum receiver and tend to carry over to the pump or blower, which is used to generate air flow. The invention provides for a compact filtration means located in the vacuum receiver, a means for back flushing the filters to clean the filters in a way so that the back flush air is brought in from the atmosphere, passed through the filters at the beginning and at the end of each fill cycle, such air being again filtered within the device and passed through the vacuum pump. The air used for back flushing and cleaning filters therefore is not allowed to pass from the vacuum receiver filtration means until it is refiltered and, thus, it is passed to the atmosphere in a clean condition. Furthermore, the vacuum receiver is not pressurized during the back flushing procedure and there is no flow of the air used for cleaning the filters out the discharge valve of the vacuum receiver, thus eliminating the problem of flowing dusty air out of the receiver during the back flushing procedure. Thus, effective cleaning of the filter is accomplished with air which is moved with the same vacuum pump used to move material, thus eliminating the need for the use of expensive compressed air and expensive sequencing systems for controlling compressed air.

More specifically, prior to each fill cycle, a flow of air is induced by the vacuum blower to move from the atmosphere about the material receiver in through a first air passageway into the receiver and through the filter of the first air passageway, thus back flushing the filter, and then from the receiver through the other filter and other passageway to the inlet of the vacuum blower. After a short time lapse, the first air passageway which is open to the atmosphere is closed and a flow of air and material is induced by the vacuum blower through the delivery conduit to the receiver, with the material dropping out of the stream of air to the lower portion of the receiver and the air moving in parallel through both air passageways and their filters to the inlet of the vacuum blower. When the desired amount of bulk material has accumulated in the receiver, the other air passageway is opened to the atmosphere and the vacuum blower continues to pull a vacuum in the receiver, thus causing a flow of air from the atmosphere about the receiver through the open air passageway to back flush its filter, then through the previously back flushed filter and its air passageway to the inlet of the vacuum blower.

Thus, it is an object of this invention to provide a compact and inexpensive filtration system for bulk material receivers, in which the filters of the receiver are back flushed during each fill cycle of the equipment.

Other objects, features and advantages of the present invention will become apparent upon reading the following specification, when taken in conjunction with the accompanying drawings.

BRIEF DESCRIPTION OF THE DRAWINGS

FIG. 1 is a perspective illustration, with parts broken away, of the bulk material receiver.

FIG. 2 is a perspective illustration, with parts broken away, of the valve assembly of the bulk material receiver.

FIG. 3 is a plan view of the internal separator plate at the upper portion of the bulk material receiver hopper.

FIG. 4 is a side elevational view of the separator plate and the filters supported by the separator plate.

FIGS. 5A, 5B, 5C and 5D are progressive schematic illustrations of the bulk material receiver, showing the flow of air and material just prior to, during and just after a fill cycle, and showing the flow of material after the air flow has terminated.

DETAILED DESCRIPTION

Referring now in more detail to the drawings, in which like numerals indicate like parts throughout the several views, FIG. 1 illustrates the bulk material receiver 10 which includes a hopper 11 having a lower converging wall portion 12, and an upper cover or "bonnet" 15, which is releasably mounted to the lower converging wall portion. Support flange 16 is rigidly mounted to lower converging wall portion 12 and is arranged to rest on any typical support structure to be provided by a customer or by the manufacturer. Discharge conduit 18 extends from the lower end of converging wall portion 12 and its lower end opening (not shown) is sloped at an angle. An outlet door or flapper valve 19 usually closes the outlet opening of discharge conduit 18. Flapper valve 19 is mounted on U-shaped hinge bracket 20, with the parallel legs 21 and 22 extending through openings in the flapper valve 19, and with the intermediate leg 24 pivotally received in opened ended socket 25. Counter weight 26 is mounted on the distal ends of legs 21 and 22 so as to cause flapper valve 19 to assume its partially closed position under the normal influence of gravity.

Thus, the lower open end of discharge conduit 18 functions as a material outlet opening of hopper 11.

Air and material inlet opening 28 is formed in hopper 11 at a level well above the material outlet opening of the hopper. Conduit 29 extends from a source of bulk material to air and material inlet opening 28 so as to transmit air and material to the hopper, as indicated by arrow 30.

The upper edge of hopper 11 is turned inwardly at 31, and the lower edge of upper cover 15 is turned outwardly in two stages to form a pair of annular recesses 32 and 34, and the lower periphery of the upper cover is turned upwardly to form upwardly turned annular flange 35. Annular recess 34 rests on the upper edge 31 of the hopper and a plurality of latches 36 are mounted about the hopper for engagement with annular flange 35 of the upper cover, for fastening the upper cover in sealed relationship on top of the hopper. A seal (not shown) can be used in annular recess 34 to prevent leakage of air between upper cover 15 and hopper 11.

Separator plate 38 (FIGS. 1 and 3) is sized and shaped to rest on the upper edge 31 of hopper 11 within annular recess 32 of upper cover 15. Separator plate 38 has air openings 39, 40, 41 and 42 therethrough. Alternatively, a different number of air openings can be used and the air openings can be noncircular. Filters 43 are located at each air opening. Each filter 43 includes a cylindrical filter screen assembly 44 mounted to the bottom surface of the separator plate 38 about each air opening 39-42 and a porous filter cover or "sock" 45 is pulled about each cylindrical filter screen assembly 44. The filter covers 45 are held in place on the filter screen assemblies by means of a band 46 extending about the upper peripheries of each filter screen assembly and filter cover. An air divider plate 48 is connected along its upper edge to the lower surface of separator plate 38 and extends between the pairs of air openings 39, 40 and 41, 42. Thus, the filter screen assemblies and their filter covers 44 and 45 and air divider plate 48 extend downwardly from separator plate 38 into the upper portion of hopper 11.

Air baffle 49 is positioned on separator plate 38 and is oriented in a vertical plane and is located between the pairs of air openings 39, 40 and 41, 42, approximately in the same plane as air divider plate 48.

Air openings 51 and 52 are formed through upper cover 15. Air opening 51 is located on one side of baffle 49 while air opening 52 is located on the other side of baffle 49. With this arrangement, baffle 49 divides the upper cover 15 into separate air passageways 54 and 55, with the air flow of passageway 54 passing through openings 39, 40 and 51, and with the air flow of passageway 55 passing through air openings 41, 42 and 52.

As illustrated in FIGS. 1 and 2, air diverter valves 56 and 58 are positioned on the upper surface of upper cover 15. Each air diverter valve 56, 58 includes a housing 59 formed from a cylindrical side wall 60 and annular end walls 61 and 62. Air opening 64 is formed in cylindrical side wall 60, and connector conduit 65 extends between air opening 64 of housing 59 and one of the air openings 51 or 52 in the upper cover 15. Atmosphere air opening 66 is formed in annular end wall 61, while exhaust air opening 68 is formed in the other annular end wall 62. Valve plate 69 is approximately disc-shaped and includes a seal 70 extending about its outer periphery. Pneumatic cylinder 71 is mounted to annular end wall 61 of valve housing 59 by means of U-shaped support bracket 72. Cylinder rod 74 extends from cylinder 71 and is connected to valve plate 69 and functions to move valve plate 69 back and forth within housing 59 so as to be in sealed engagement with either annular end wall 61 or annular end wall 62, thus closing either exhaust opening 68 or atmosphere air opening 66.

A conduit 75 includes branch legs 76 and 77 each connected at their ends to the annular end wall 62 of one of the air diverter valves 56, 58. The base leg 78 of the conduit communicates with the inlet of a vacuum blower 79.

Each pneumatic cylinder 71 is controlled by a solenoid valve 80, so that the air diverter valves 56 and 58 are controlled independently of each other. The solenoid valve 80 can be manually actuated or actuated with a timer and with level control switches located internally of hopper 11, if desired.

As illustrated in FIG. 5A, when the fill cycle of the bulk material is initiated, the vacuum blower is energized and one of the air diverter valves 56, 58 opens to the atmosphere while the other air diverter valve is opened to the exhaust conduit 75, thus inducing a flow of air from the atmosphere about the hopper 11 to move through the air diverter valve 56, and then through the passageway 54 and the filters 45 on one side of air divider plate 48, thus back washing one set of filters, and then flowing through the other filters 45, the other air passageway 56, through air diverter valve 58 to exhaust conduit 75.

As illustrated in FIG. 5B, after a predetermined period of time, air diverter valve 56 closes the flow of air from the atmosphere and opens communication between air exhaust conduit 75 and passageway 54, thus inducing a flow of air and material through conduit 29 as indicated by arrow 30 into hopper 11. The bulk material tends to accumulate as indicated at 81 in the hopper 11 while the air moves in a parallel flow path through the filters 43 on opposite sides of air divider plate 48 and on opposite sides of air baffle 49.

As illustrated in FIG. 5C, when a desired amount of bulk material has accumulated in hopper 11, air diverter valve 58 is opened to the atmosphere while air diverter valve 56 remains closed to the atmosphere. This causes air from the atmosphere about the hopper 11 to flow inwardly through air diverter valve 58, downwardly through passageway 55, thus back washing the filter 43 of passageway 55, then about air divider plate 48 and upwardly through the filters 43 of air passageway 54 and through air diverter valve 56 to air exhaust conduit 75.

As illustrated in FIG. 5D, after a time lapse, air diverter valve 56 is opened to the atmosphere and the operation of the vacuum blower is terminated, thus terminating the flow of air through the hopper 11, which allows the flapper valve 19 to open and the bulk material to flow downwardly through the bulk material outlet opening. While this invention has been described in specific detail with particular reference to a preferred embodiment thereof, it will be understood that variation and modifications can be effected within the spirit and scope of the invention as described hereinbefore and as defined in the appended claims.

I claim:

1. A bulk material receiver comprising a receiver hopper, a material inlet opening in said hopper above the lower portion of said hopper for receiving a flow of air and bulk material, a material outlet opening in the lower portion of said hopper for discharging the bulk material, at least two air openings in the upper portion of said hopper for the passage of air therethrough, a filter element mounted adjacent each air opening so as to filter the air passing through its air opening, a vacuum blower, an air exhaust conduit connected to the inlet of said vacuum blower and for communication at its other end with said air openings, valve means in said air exhaust conduit for controlling the flow of air through said air openings, said valve means including means for placing said air openings in communication with said air exhaust conduit to direct air through the material inlet opening into the hopper and through all of said filter elements and through all of said air openings to said air exhaust conduit and for placing at least one of said air openings in communication with the atmosphere outside said hopper and others of said air openings in communication with said air exhaust conduit to direct air from the atmosphere through said at least one air opening and its filter element into the hopper and through the other filter element and the other air openings to said air exhaust conduit.

2. The bulk material receiver of claim 1 and wherein said valve means comprises a valve for each of said air openings with each said valve including a housing defining an atmosphere opening for communication with the atmosphere, a hopper opening for communication with said hopper and an exhaust opening for communication with the exhaust conduit, and a valve element to selectively close either said atmosphere opening or said exhaust opening.

3. The bulk material receiver of claim 1 and wherein said hopper comprises a body portion a lower section with converging wall surface, and a removable upper cover section mounted on said body portion, at least two air openings formed in said upper cover section, a separator plate supported in said hopper and separating said hopper and said cover section into lower and upper internal chambers, at least two air openings formed in said separator plate, a baffle extending from said separator plate into the upper section of said cover section and between the air openings in said separator plate and dividing the upper cover section of said hopper into separate air passageways, and filters mounted about the air openings of said separator plate.

4. The bulk material receiver of claim 3 and wherein said filters extend downwardly from the openings in said separator plate into the chamber of the hopper below said separator plate.

5. A bulk material receiver comprising a hopper defining a material outlet at its lower portion for the movement of material out of the hopper and a material inlet at a level above said outlet for the movement of material into the hopper, said hopper including at least two air openings positioned above said material inlet, filter means for said air openings, a vacuum blower, an air exhaust conduit connected between the inlet of said vacuum blower and said two air openings, valve means for selectively communicating the air openings either with said air exhaust conduit or with the atmosphere about said material receiver, whereby when the valve means communicates both air openings with said air exhaust conduit, material and air move through the material inlet into said hopper and the material accumulates in said hopper and the air moves through the air openings and the air exhaust conduit, and when the valve means communicates one air opening with the air exhaust conduit and the other air opening with the atmosphere, air moves from the atmosphere through an air opening and into the hopper and then from the hopper through the other air opening through the exhaust conduit.

6. A method of filling a bulk material hopper with bulk material comprising the steps of inducing a flow of air inwardly through a first air passageway and a first filter into a bulk material hopper and then outwardly through a second filter and a second air passageway and out of the bulk material hopper to back wash the first filter, then inducing a flow of air and bulk material through a material inlet opening into the hopper and accumulating the bulk material in the hopper and inducing the air to flow through both the first and second filters in parallel and through both the first and second air passageways in parallel and out of the bulk material hopper, and when the desired amount of bulk material has accumulated in the hopper inducing a flow of air inwardly through the second air passageway and the second filter into the bulk material hopper and then through the first filter and the first air passageway and out of the bulk material hopper to back wash the first filter.

7. The method of claim 6 and further including the step of dispensing the bulk material from the bulk material hopper.

8. A bulk material receiver comprising a hopper defining a material outlet at its lower portion for the movement of material out of the hopper and a material inlet at a level above said outlet for the movement of material into the hopper, said hopper including at least two air openings positioned above said material inlet, filter means for said air openings, a vacuum blower, an air exhaust conduit connected between the inlet of said vacuum blower and said two air openings, valve means for selectively communicating the air openings either with said air exhaust conduit or with the atmosphere about said material receiver, whereby when the valve means communicates both air openings with said air exhaust conduit, material and air move through the material inlet into said hopper and the material accumulates in said hopper and the air moves through the air openings and the air exhaust conduit, and when the valve means communicates one air opening with the air exhaust conduit and the other air opening with the atmosphere, air moves from the atmosphere through an air opening and into the hopper and then from the hopper through the other air opening through the exhaust conduit, and further including a separator plate mounted in said hopper and separating the portion of said hopper which defines said air openings from the portion of said hopper which defines said material inlet and said material outlet, at least two air openings defined in said separator plate, a baffle extending from said separator plate into the upper portion of said cover section and forming the cover section of said hopper into separate air passageways between the air openings of said separator plate and the air openings of said hopper, and wherein said filter comprises a filter mounted about the air openings of said separator plate.

9. A bulk material receiver comprising:

a hopper having a material outlet at a lower portion for the movement of material out of the hopper, and having a material inlet for the movement of material into said hopper at a level above said outlet;

said hopper including at least two air openings above said material inlet;

filter means associated with said air openings;

exhaust means selectably communicating with said air openings so as to draw air from said hopper through said filter means and said air openings; and valve means operatively associated with said air openings and said exhaust means, and selectably operative to communicate both said air openings with the exhaust means so that air and material move through said material inlet into the hopper, or to communicate one said air opening with the atmosphere outside the hopper and to communicate another said air opening with said exhaust means so that air from the atmosphere moves through said one air opening and associated filter means into the hopper and through said other air opening and associated filter means to said exhaust means, thereby back flushing the filter means associated with said one air opening and filtering the back flushing air flowing from said hopper through said other air opening.

* * * * *